(12) United States Patent
Itoh et al.

(10) Patent No.: US 12,140,226 B2
(45) Date of Patent: Nov. 12, 2024

(54) PARKING LOCK DEVICE AND VEHICLE

(71) Applicant: HONDA MOTOR CO., LTD., Tokyo (JP)

(72) Inventors: Yohei Itoh, Saitama (JP); Hiroyuki Kikuchi, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 18/169,831

(22) Filed: Feb. 15, 2023

(65) Prior Publication Data

US 2023/0272852 A1 Aug. 31, 2023

(30) Foreign Application Priority Data

Feb. 28, 2022 (JP) ................................ 2022-029884

(51) Int. Cl.
*F16H 63/34* (2006.01)
(52) U.S. Cl.
CPC ..... *F16H 63/3466* (2013.01); *F16H 63/3425* (2013.01)
(58) Field of Classification Search
CPC ............. F16H 63/3425; F16H 63/3466; F16H 63/3491
See application file for complete search history.

(56) References Cited

U.S. PATENT DOCUMENTS

| 9,657,836 | B2* | 5/2017 | Kristofcsak | ......... F16H 63/3416 |
| 9,777,836 | B1* | 10/2017 | Lee | ............................ F16H 3/66 |
| 9,995,390 | B2* | 6/2018 | Al-Regib | ................ F16H 63/34 |
| 2020/0182353 | A1* | 6/2020 | Klein | ...................... F16H 21/44 |
| 2021/0396312 | A1* | 12/2021 | Petersson | ............ F16H 63/3483 |
| 2022/0299111 | A1* | 9/2022 | Steiner | .................... F16H 63/38 |

FOREIGN PATENT DOCUMENTS

| JP | 2018158619 A | * 10/2018 |
| JP | 2021055761 A | 4/2021 |

* cited by examiner

*Primary Examiner* — Stacey A Fluhart
(74) *Attorney, Agent, or Firm* — CKC & PARTNERS CO., LLC

(57) ABSTRACT

The parking lock device includes: a parking gear; a fitting portion that is fittable into the parking gear; an engaging portion that engages with the fitting portion; and a driving portion that drives the engaging portion to move the fitting portion in a release direction with respect to the parking gear, the fitting portion including a re-fitting part that generates a re-fitting action based on stress generated during a period in which a fitting operation for fitting the fitting portion into the parking gear is not completed.

11 Claims, 13 Drawing Sheets

PARKING LOCK DEVICE AND VEHICLE

This application is based on and claims the benefit of priority from Japanese Patent Application No. 2022-029884, filed on 28 Feb. 2022, the content of which is incorporated herein by reference.

BACKGROUND OF THE INVENTION

Field of the Invention

The present invention relates to a parking lock device and a vehicle.

Related Art

A vehicle is provided with a parking lock device for preventing rotation of wheels. The parking lock device locks wheels by fitting of a protrusion of a parking pawl into one of recesses of a parking gear that rotates as the wheels rotate.

When the parking lock device is in a fitting operation, the protrusion of the parking pawl may not be fitted into any of the recesses of the parking gear and collide with projections of the parking gear, thereby causing the parking pawl to be flipped up. When the parking pawl is flipped up, the fitting operation by the parking pawl is not completed. The impact caused when the parking pawl is flipped up is transmitted to a parking rod for moving the parking pawl toward the parking gear, and is further transmitted to a driving portion such as an actuator through the parking rod. As a result, the parking rod and the driving portion are likely to be damaged.

In the related art, a parking lock device is known in Japanese Unexamined Patent Application, Publication No. 2021-55761. A parking rod of the parking lock device includes a substantially conical cam member and a coil spring. The coil spring urges the cam member toward one end of the parking rod. The one end of the parking rod is inserted into a through-hole in a sleeve member. When the parking rod moves in a direction to cross the through-hole by driving of an actuator connected to the other end of the parking rod, the cam member slides against the parking pawl, and the parking pawl is moved toward the parking gear by a cam surface. As a result, a protrusion of the parking pawl is fitted into one of recesses of the parking gear.

In the parking lock device, the through-hole is an oblong hole into which one end of the parking rod is inserted. Thus, when the impact when the parking pawl is flipped up is transmitted to the parking rod through the cam member, the one end of the parking rod can move within the oblong hole. This reduces the risk of component damage due to the impact when the parking pawl is flipped up.

Patent Document 1: Japanese Unexamined Patent Application, Publication No. 2021-55761

SUMMARY OF THE INVENTION

In the parking lock device according to the related art, the force acting on the parking rod when the parking pawl is flipped up also acts on the coil spring through the cam member. In other words, the flipped parking pawl slides on the cam surface of the cam member, thereby moving the cam member and contracting the coil spring. This is because it is necessary to move the cam member again toward the one end of the parking rod in order to perform a re-fitting operation when the parking gear rotates to be ready to be fitted. In the re-fitting operation, the contracted coil spring expands to cause the cam member to slide against the parking pawl and to move the parking pawl toward the parking gear again. In other words, the parking rod has a role of performing the re-fitting operation in the parking lock device according to the related art.

However, in the parking lock device according to the related art, since stress always acts on the parking rod due to the contraction of the coil spring during a period in which the fitting operation is not completed while the parking pawl is flipped up, a load may be applied not only to the parking rod but also to the driving portion through the parking rod. Moreover, when the force acting on the parking rod cannot be relieved due to deterioration of the coil spring, the load applied to the parking rod and the driving portion increases further.

The present invention is to provide a parking lock device that causes a member fittable into a parking gear to have a role of performing a re-fitting operation to thereby inhibit stress for the re-fitting operation from acting on a driving portion during a period in which a fitting operation is not completed, and that is capable of reducing a load applied to the driving portion. The present invention is to provide a vehicle equipped with the parking lock device, as well.

(1) The present invention provides a parking lock device (for example, a parking lock device 3 to be described below) including: a parking gear (for example, a parking gear 31 to be described below); a fitting portion (for example, a parking pawl 32 to be described below) that is fittable into the parking gear; an engaging portion (for example, a parking rod 34 or a cord-like member 340 to be described below) that engages with the fitting portion; and a driving portion (for example, an actuator 35 to be described below) that drives the engaging portion to move the fitting portion in a release direction with respect to the parking gear, the fitting portion including a re-fitting part (for example, a parking pawl spring 33, a pressing spring 33A, or a tension spring 33B to be described below) that generates a re-fitting action based on stress generated during a period in which a fitting operation for fitting the fitting portion into the parking gear is not completed.

(2) In the parking lock device disclosed in (1) above, either the fitting portion or the engaging portion may include a relief portion (for example, an oblong hole 324a or a cord-like member 340 to be described below) for the stress generated during the period in which the fitting operation for fitting the fitting portion into the parking gear is not completed.

(3) In the parking lock device disclosed in (1) or (2) above, the fitting portion may include an engaged portion (for example, an engagement hole 324 to be described below) provided adjacent to one end (for example, a rear end 32a to be described below) and engaged with the engaging portion and the re-fitting part provided adjacent to the other end (for example, a front end 32b to be described below), and the other end of the fitting portion may be provided with a turning shaft (for example, a turning shaft 321 to be described below) that accumulates energy for causing the re-fitting part to generate the re-fitting action when the stress is generated during the period in which the fitting operation is not completed.

(4) In the parking lock device disclosed in (3) above, the re-fitting part may use the accumulated energy to generate energy required for the re-fitting action.

(5) In the parking lock device disclosed in any one of (1) to (4) above, the engaging portion may include an engaging projection (for example, a first engagement pin 342 to be described below) to be inserted into the engaged portion, and when the engaging portion is driven by the driving portion, the engaging projection abuts on the engaged portion, thereby performing a release operation for releasing the fitting portion from the parking gear.

(6) The present invention provides a vehicle (for example, a vehicle 1 to be described below) including: a right wheel (for example, a right rear wheel 12a to be described below); a left wheel (for example, a left rear wheel 12b to be described below); and the parking lock device according to any one of (1) to (5) above, the parking gear, the fitting portion, and the engaging portion being provided for each of the right wheel and the left wheel, the driving portion including one drive shaft (for example, a drive shaft 351 to be described below), the engaging portion corresponding to the right wheel and the engaging portion corresponding to the left wheel each being connected to the one drive shaft.

According to (1) above, since the fitting portion fittable into the parking gear per se includes the re-fitting part, it is not necessary for the engaging portion to have the role of receiving the stress that occurs during a period in which the fitting operation is not performed and a role of performing the re-fitting operation based on the stress. Therefore, it is possible to prevent the stress for re-fitting from being transmitted to the driving side through the engaging portion.

According to (2) above, the fitting portion can effectively avoid the influence on the driving portion during the period in which the fitting operation is not completed.

According to (3) above, during the period in which the fitting operation is not completed, the fitting portion rotates around the turning shaft in the release direction, and can accumulate energy for rotating the fitting portion around the re-fitting part in the fitting direction.

According to (4) above, it is possible to efficiently generate energy required for the re-fitting operation for the fitting portion. Since the energy for re-fitting acts on the fitting portion during the period in which the fitting operation is not completed, power of the driving portion can be turned OFF, and power consumption can be reduced.

According to (5) above, it is possible to simply configure a mechanism for realizing the release operation for releasing the fitting portion from the parking gear.

According to (6) above, it is not necessary to provide the driving portion for each of the parking gears corresponding to each wheel. Therefore, the parking lock device can be configured compactly. When being flipped up, the fitting portions can each be independently refitted into the parking gear.

DETAILED DESCRIPTION OF THE INVENTION

Figure 1:
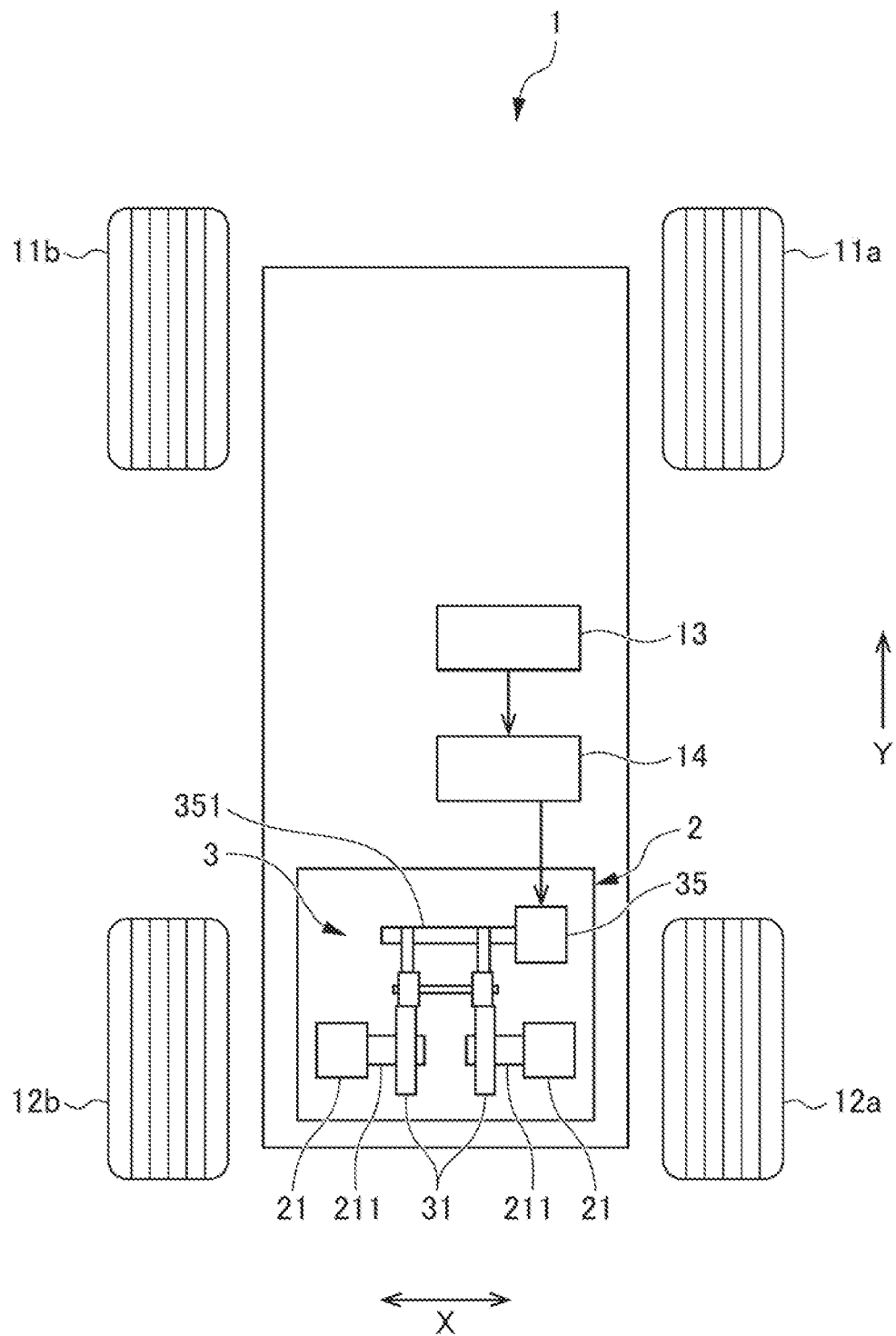
FIG. 1 is a plan view schematically showing a vehicle according to an embodiment.

Hereinafter, an embodiment of the present invention will be described in detail with reference to the drawings. FIG. 1 shows a vehicle 1 including a parking lock device 3. The vehicle 1 includes front wheels 11a and 11b and rear wheels 12a and 12b. The vehicle 1 is self-propelled by rotating the rear wheels 12a and 12b, which are connected to a driving unit 2, with a power source.

The vehicle 1 of the present embodiment includes a pair of electric motors 21 mounted on the driving unit 2 as power source. Driving of the pair of electric motors 21 is controlled by a system controller 13 that controls an overall operation of the vehicle 1. However, the power source provided in the vehicle 1 may be an internal combustion engine, or may be both the internal combustion engine and the electric motor.

Front, rear, left, and right directions of the vehicle 1 are based on directions of the vehicle 1 shown in FIG. 1. A Y-direction in the drawings indicates a front of the vehicle 1, and an X-direction indicates a width direction of the vehicle 1. Thus, "front" indicates an upward direction in FIG. 1, and "rear" indicates a downward direction in FIG. 1. "Left" indicates a left direction along the X-direction in FIG. 1, and "right" indicates a right direction along the X-direction in FIG. 1.

Figure 2:
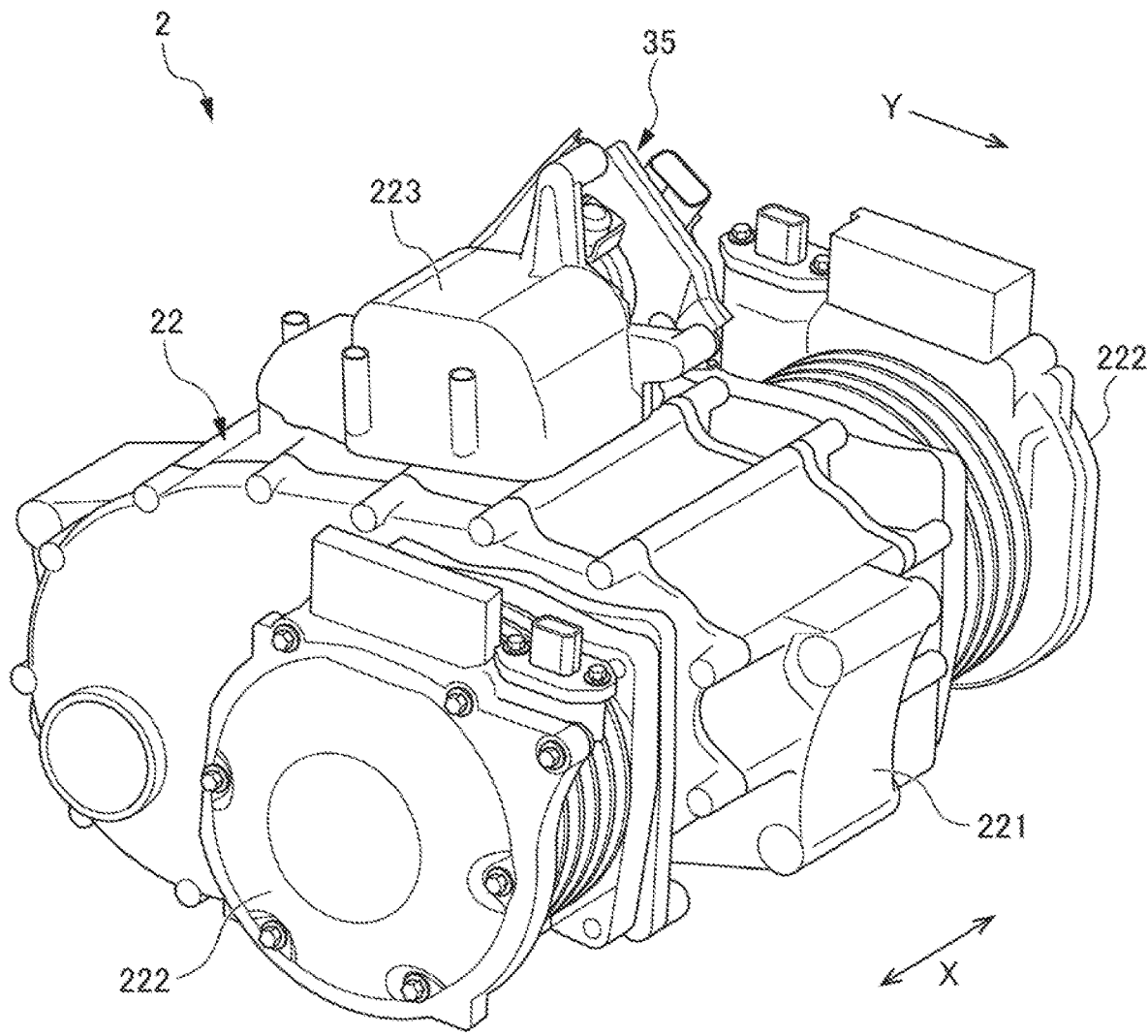
FIG. 2 is a perspective view showing a driving unit including a parking lock device.
Figure 3:
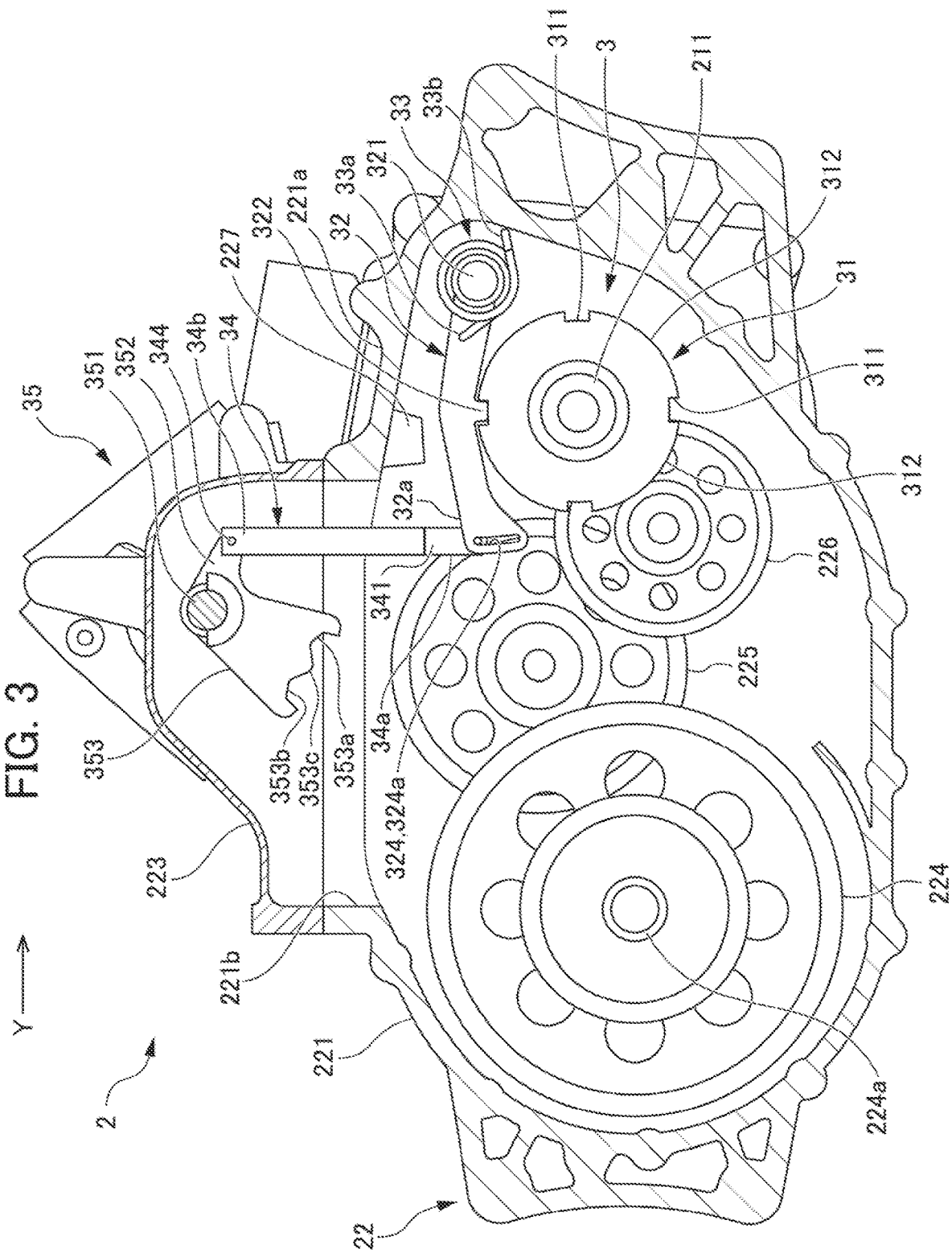
FIG. 3 is a longitudinal cross-section view of the driving unit.

The driving unit 2 is disposed at a rear of the vehicle 1. The driving unit 2 includes a housing 22 made of metal such as aluminum by die-casting as shown in FIGS. 2 and 3. The housing 22 includes a housing body 221, motor housings 222, and a cover 223 that covers an upper portion of the housing body 221. The motor housings 222 are disposed on both sides in the width direction of the vehicle 1 with respect to the housing body 221, and house the electric motors 21, respectively.

The housing body 221 houses a plurality of drive gears and the parking lock device 3. The driving force of the electric motor 21 is transmitted to the rear wheels 12a and 12b corresponding to the electric motor 21 through the plurality of drive gears. FIG. 3 shows drive gears 224, 225, and 226 that transmit the driving force of the left electric motor 21 in the driving unit 2 to the left rear wheel 12b. A rotating shaft (not shown) of the rear wheel 12b is connected to a rotating shaft 224a of the drive gear 224. A configuration for transmitting the driving force of the right electric motor 21 in the driving unit 2 to the right rear wheel 12a is also the same as described above.

Figure 4:
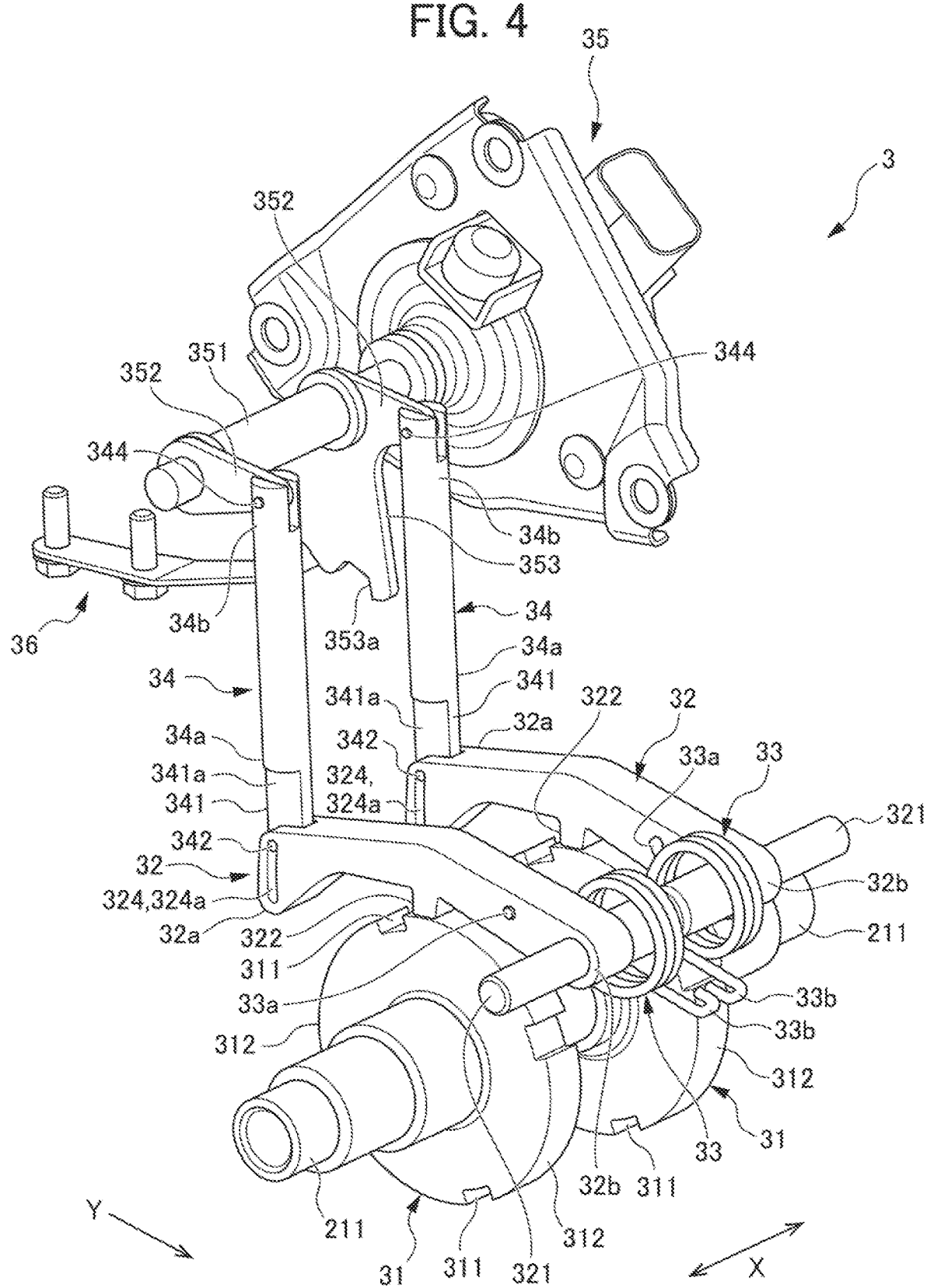
FIG. 4 is a perspective view showing main portions of the parking lock device.

The parking lock device 3 includes a parking gear 31, a parking pawl 32, a parking pawl spring 33, a parking rod 34, and an actuator 35, as shown in FIGS. 3 and 4. The parking gear 31, the parking pawl 32, the parking pawl spring 33, and the parking rod 34 are provided in pairs corresponding to the rear wheels 12a and 12b, respectively. The actuator 35 is a drive source for driving the parking lock device 3, and is provided in the parking lock device 3 only with one. FIG. 3 shows the parking gear 31, the parking pawl 32, the parking pawl spring 33, and the parking rod 34 which lock the left rear wheel 12b of the vehicle 1, and one actuator 35 commonly used for locking the left and right rear wheels 12a and 12b.

The parking gears 31 are provided on output shafts 211 of the pair of electric motors 21, respectively, and rotate independently when the electric motors 21 are driven, respectively. The output shafts 211 of the pair of electric motors 21 are disposed coaxially and extend in the width direction of the vehicle 1.

The parking gear 31 includes recesses 311 and projections 312 that are disposed alternately in a circumferential direction. The parking gear 31 of the present embodiment includes four recesses 311 and four projections 312 that are disposed at angles of 90° in the circumferential direction of the output shaft 211. However, the number of recesses 311 and the number of projections 312 are not limited to four.

The parking pawl 32 is disposed radially outside and above the parking gear 31 and extends in a front-rear direction of the vehicle 1. The parking pawl 32 engages with the parking rod 34 (which will be described below) at a rear end 32a, and includes a turning shaft 321 at a front end 32b. The turning shaft 321 extends in the width direction of the vehicle 1 and is disposed parallel to the output shaft 211 of the electric motor 21. The turning shaft 321 is provided on each of the pair of parking pawls 32. The pair of turning shafts 321 are coaxially disposed and rotatably mounted in the housing body 221. The pair of parking pawls 32 are independently rotatable around the turning shafts 321, respectively.

The parking pawl 32 includes one protrusion 322 that protrudes toward an outer peripheral surface of the parking gear 31. The protrusion 322 is disposed at a position closer to the rear end 32a of the parking pawl 32 than the turning shaft 321, and has a shape fittable into the recesses 311 of the parking gear 31. The protrusion 322 is fitted into one of the recesses 311, whereby the parking pawl 32 meshes with the parking gear 31 such that the parking gear 31 is held in a non-rotatable manner. In the present embodiment, the parking pawl 32 constitutes a fitting portion that fits into the parking gear 31.

The parking pawl spring 33 is a coil-shaped spring that urges the parking pawl 32 toward the parking gear 31 in a direction (a d23 direction in FIG. 6) to rotate around the turning shaft 321. The parking pawl spring 33 is disposed coaxially on an outer circumference of the turning shaft 321 of the parking pawl 32. One end 33a of the parking pawl spring 33 protrudes toward a rear of the vehicle 1, and is fixed to the parking pawl 32 by being inserted into a hole provided in the parking pawl 32, for example. The other end 33b of the parking pawl spring 33 protrudes toward a front of the vehicle 1, and is fixed to the housing body 221. Thus, the parking pawl spring 33 exerts an urging force on the parking pawl 32 toward the parking gear 31 in the direction to rotate around the turning shaft 321.

When the parking pawl 32 rotates toward the parking gear 31 due to the urging force of the parking pawl spring 33, the protrusion 322 of the parking pawl 32 can be fitted into one of the recesses 311 of the parking gear 31. When a position of one of the recesses 311 matches a position of the protrusion 322, the protrusion 322 becomes fitted into the recess 311. At this time, the parking pawl 32 is disposed at the fitting position, and holds the parking gear 31 in a non-rotatable manner.

On the other hand, when the parking pawl 32 rotates in a direction (a d13 direction in FIG. 6) away from the parking gear 31 against the urging force of the parking pawl spring 33, the parking pawl 32 separates from the parking gear 31. When the protrusion 322 comes off from the recess 311, the parking pawl 32 is disposed at a release position. When the parking pawl 32 is disposed at the release position, the parking pawl spring 33 contracts and accumulates energy to exert the urging force on the parking pawl 32.

When the parking pawl 32 is flipped up from the parking gear 31 and the fitting operation is not completed, as will be described below, the urging force generated by the parking pawl spring 33 is also used to re-rotate the parking pawl 32 toward the parking gear 31 and to re-fit the protrusion 322 into one of the recesses 311.

Accordingly, in the present embodiment, the parking pawl spring 33 constitutes a re-fitting means that generates a re-fitting action of the parking pawl 32 on the parking gear 31. Further, the parking pawl 32 includes the parking pawl spring 33 as the re-fitting means that generates the re-fitting action based on stress generated when the fitting of the parking pawl 32 into the parking gear 31 is not completed. The re-fitting means including the parking pawl spring 33 and the turning shaft 321 uses the accumulated energy to generate an urging force as energy required for the re-fitting action of the parking pawl 32.

As shown in FIG. 3, the housing body 221 includes an upper wall 221a that covers the parking gear 31 and the parking pawl 32 from above. A restriction projection 227 is provided on an inner surface of the upper wall 221a to project downward. The restriction projection 227 is disposed directly above a position slightly closer to the rear end 32a than the central portion in a longitudinal direction of the parking pawl 32. When the parking pawl 32 rotates in a release direction, the restriction projection 227 abuts on the parking pawl 32, and restricts a rotation angle of the parking pawl 32 in the release direction. The restriction projection 227 is provided in pairs corresponding to the left and right parking pawls 32, and is fixed to the upper wall 221a with a screw or the like. The restriction projection 227 may be provided commonly to the left and right parking pawls 32, or may be formed integrally with the upper wall 221a.

Figure 5:
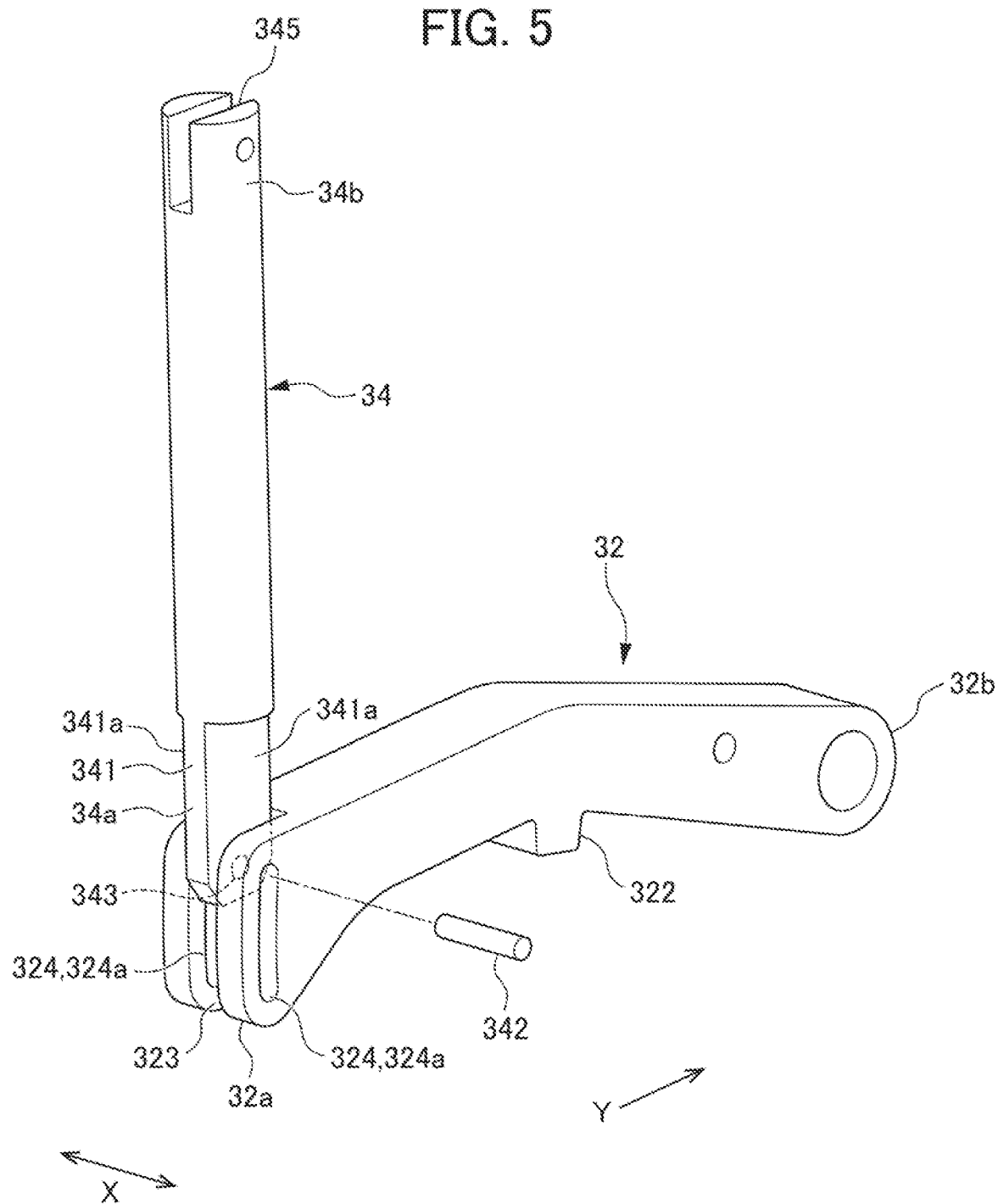
FIG. 5 is a perspective view showing an engagement part between a parking pawl and an engaging portion.

The parking rod 34 is a rod-like member made of metal that extends straight in the up-down direction inside the housing body 221. A lower end 34a of the parking rod 34 is mounted rotatably on the rear end 32a of the parking pawl 32. Specifically, a narrow thin plate 341 is formed on the lower end 34a of the parking rod 34 as shown in FIGS. 4 and 5. Opposite planes 341a of the thin plate 341 face each other in the width direction of the vehicle 1. The thin plate 341 is inserted into a groove 323 formed in the rear end 32a of the parking pawl 32. The groove 323 penetrates through the rear end 32a of the parking pawl 32 in the up-down direction, and opens rearward.

The parking rod 34 engages with the rear end 32a of the parking pawl 32 with a first engagement pin 342 as shown in FIG. 5. The first engagement pin 342 penetrates through the parking pawl 32 in the width direction of the vehicle 1, and is inserted into a circular through-hole 343 provided near the lower end of the thin plate 341. Both end of the first engagement pin 342 inserted into the through-hole 343 form projections that protrude from both surfaces of the thin plate 341, respectively. In the present embodiment, the parking rod 34 constitutes an engaging portion that engages with the parking pawl 32.

In the rear end 32a of the parking pawl 32, engagement holes 324 are formed that penetrate through the parking pawl 32 in the width direction of the vehicle 1. The engagement holes 324 are disposed in the rear end 32a of the parking pawl 32 with the groove 323 interposed therebetween. The pair of engagement holes 324 communicate with each other through the groove 323. Each of the engagement holes 324 is an oblong hole 324a having an arc shape centered on the turning shaft 321 of the parking pawl 32.

Both ends of the first engagement pin 342 are housed in the pair of oblong holes 324a, respectively. Thus, the parking rod 34 engages with the parking pawl 32. In the present embodiment, the engagement hole 324 constitutes an engaged portion that engages with the parking rod 34, which is an engaging portion. The first engagement pin 342 constitutes an engaging projection that is inserted into the engagement hole 324 which is the engaged portion. The engaging projection is not limited to a pin penetrating through the parking rod 34, and may be configured by a projection formed integrally with the lower end 34a of the parking rod 34.

The first engagement pin 342 is movable in the up-down direction within a range of the oblong holes 324a. For this reason, the parking pawl 32 engaged with the parking rod 34 can rotate about the turning shaft 321 with respect to the parking rod 34 within the range of the oblong holes 324a. Therefore, due to the rotation within the oblong holes 324a with respect to the first engagement pin 342, the parking pawl 32 can relieve the stress generated when being flipped up by the parking gear 31. In other words, the engagement hole 324, which is the engaged portion, includes the oblong holes 324a as a relief portion for engagement with the parking rod 34 in the present embodiment.

As shown in FIG. 3, upper ends 34b, which are the other ends of the pair of parking rods 34, protrude upward from openings 221b provided in the upper wall 221a of the housing body 221, respectively. The cover 223 is mounted on the openings 221b so as to cover the upper ends 34b of the pair of parking rods 34 protruding from the openings 221b.

The single actuator 35 provided in the driving unit 2 is disposed outside the cover 223, and outside in the direction in which the pair of parking rods 34 are aligned. The actuator 35 includes one drive shaft 351. The drive shaft 351 is disposed over the upper ends 34b of the pair of parking rods 34, and extends in the width direction of the vehicle 1 by penetrating through the cover 223. The actuator 35 is driven based on a driving signal sent from the actuator controller 14 shown in FIG. 1, and can rotate the drive shaft 351 by a predetermined angle in a clockwise direction in FIG. 6 (a d21 direction in FIG. 6) and in a counterclockwise direction (a d11 direction in FIG. 6).

A rotary encoder or a motor such as a stepping motor or a servo motor can be used. The actuator controller 14 is controlled by a system controller 13.

As shown in FIG. 4, both the upper ends 34b of the pair of parking rods 34 are connected to the drive shaft 351. The drive shaft 351 includes a pair of brackets 352 corresponding to the pair of parking rods 34. Each of the pair of brackets 352 is made of a plate-like member, and protrudes toward the front of the vehicle 1 to be fixed to the drive shaft 351.

The upper ends 34b of the pair of parking rods 34 are rotatably connected to tips of the brackets 352 by a second engagement pin 344, respectively. Specifically, as shown in FIG. 5, the upper end 34b of the parking rod 34 includes a groove 345 into which the tip of the bracket 352 is inserted. The groove 345 penetrates through the upper end 34b of the parking rod 34 in the front-rear direction, and opens upward. The second engagement pin 344 penetrates through the upper end 34b of the parking rod 34 and the bracket 352 inserted into the groove 345 in the width direction of the vehicle 1. Thus, the upper end 34b of the parking rod 34 is rotatably mounted on the bracket 352 around the second engagement pin 344.

Figure 6:
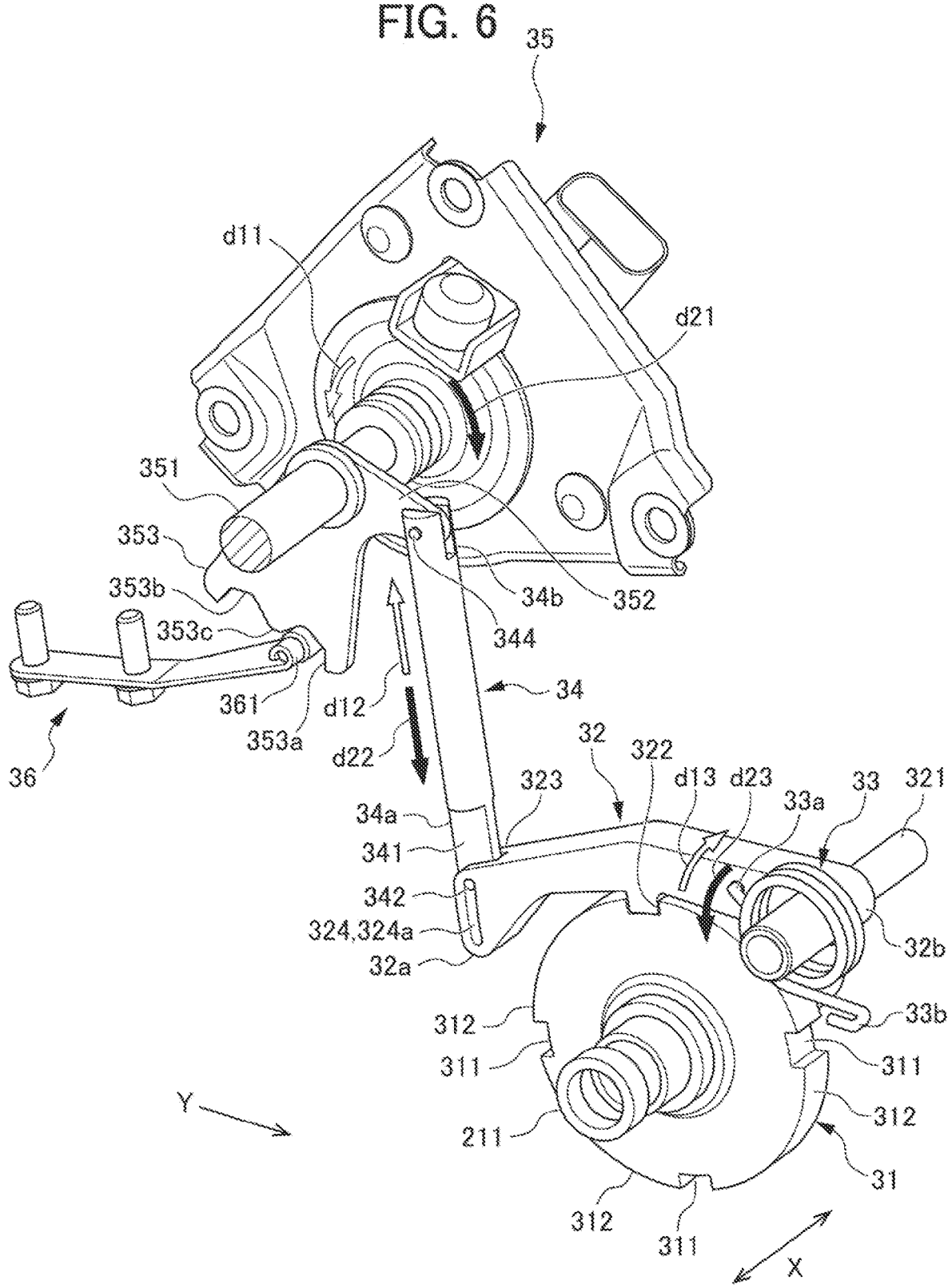
FIG. 6 is a perspective view showing an operation of the main portions of the parking lock device.

As shown in FIGS. 3, 4, and 6, one locking plate 353 is fixed to the drive shaft 351. The locking plate 353 positions the drive shaft 351 by restricting a position in the rotation direction of the drive shaft 351. The locking plate 353 of the present embodiment is provided integrally with one bracket 352 of the pair of brackets 352. The locking plate 353 is disposed at a distance of about 90° from the position of the bracket 352 in the circumferential direction of the drive shaft 351, and overhangs downward from the drive shaft 351. The locking plate 353 rotates integrally with the bracket 352 when the drive shaft 351 rotates.

The locking plate 353 includes a first recess 353a, a second recess 353b, and a projection 353c on a tip edge thereof. The first recess 353a is disposed closer to the parking rod 34 relative to the second recess 353b. The projection 353c is disposed between the first recess 353a and the second recess 353b.

A locking member 36 is disposed near the locking plate 353. The locking member 36 is formed of an elastic metal plate and is fixed inside the housing body 221 on the rear of the vehicle 1 relative to the locking plate 353. A tip of the locking member 36 extends toward the tip edge of the locking plate 353.

The locking member 36 includes, at its tip, a locking portion 361 formed by rounding of a metal plate. The locking portion 361 is fitted into the first recess 353a and the second recess 353b of the locking plate 353 to restrict and position the position in the rotation direction of the drive shaft 351. The actuator 35 rotates the drive shaft 351 in a forward direction and a reverse direction by an angle at which the locking portion 361 of the locking member 36 can be fitted into the first recess 353a and the second recess 353b of the locking plate 353. In FIG. 3, the locking member 36 is not shown.

FIG. 6 shows a state in which the locking portion 361 is fitted into the first recess 353a to lock the locking plate 353. At this time, the drive shaft 351 is fixed at the maximum rotation position in a clockwise direction (a d21 direction). The parking rod 34 moves downward (in a d22 direction) by the clockwise rotation of the bracket 352. The first engagement pin 342 inside the oblong holes 324a of the parking pawl 32 abuts on the upper end of the oblong holes 324a. This is because the parking pawl 32 is urged in the direction (d23 direction) toward the parking gear 31 by the urging force of the parking pawl spring 33.

From this state, when the drive shaft 351 rotates by a predetermined angle in the counterclockwise direction (d11 direction) in FIG. 6, the locking portion 361 of the locking member 36 is fitted into the second recess 353b of the locking plate 353 to lock the locking plate 353. Thus, the drive shaft 351 is positioned. The parking rod 34 moves upward (in the d12 direction) as the bracket 352 rotates, and thus moves the parking pawl 32 in the release direction with respect to the parking gear 31. Therefore, in the present embodiment, the actuator 35 constitutes a driving portion that drives the pair of parking rods 34 to move the parking pawl 32 in the release direction with respect to the parking gear 31.

An operation of the parking lock device 3 will be described in more detail below with reference to FIGS. 7 to 10. First, it is assumed that the parking lock device 3 is in a locked state in an initial state. In other words, as shown in FIGS. 3 and 6, the protrusion 322 is fitted into the recess 311 of the parking gear 31. Thus, the parking pawl 32 is disposed at the fitting position. The locking portion 361 of the locking member 36 is fitted into the first recess 353a of the locking plate 353.

Figure 7:
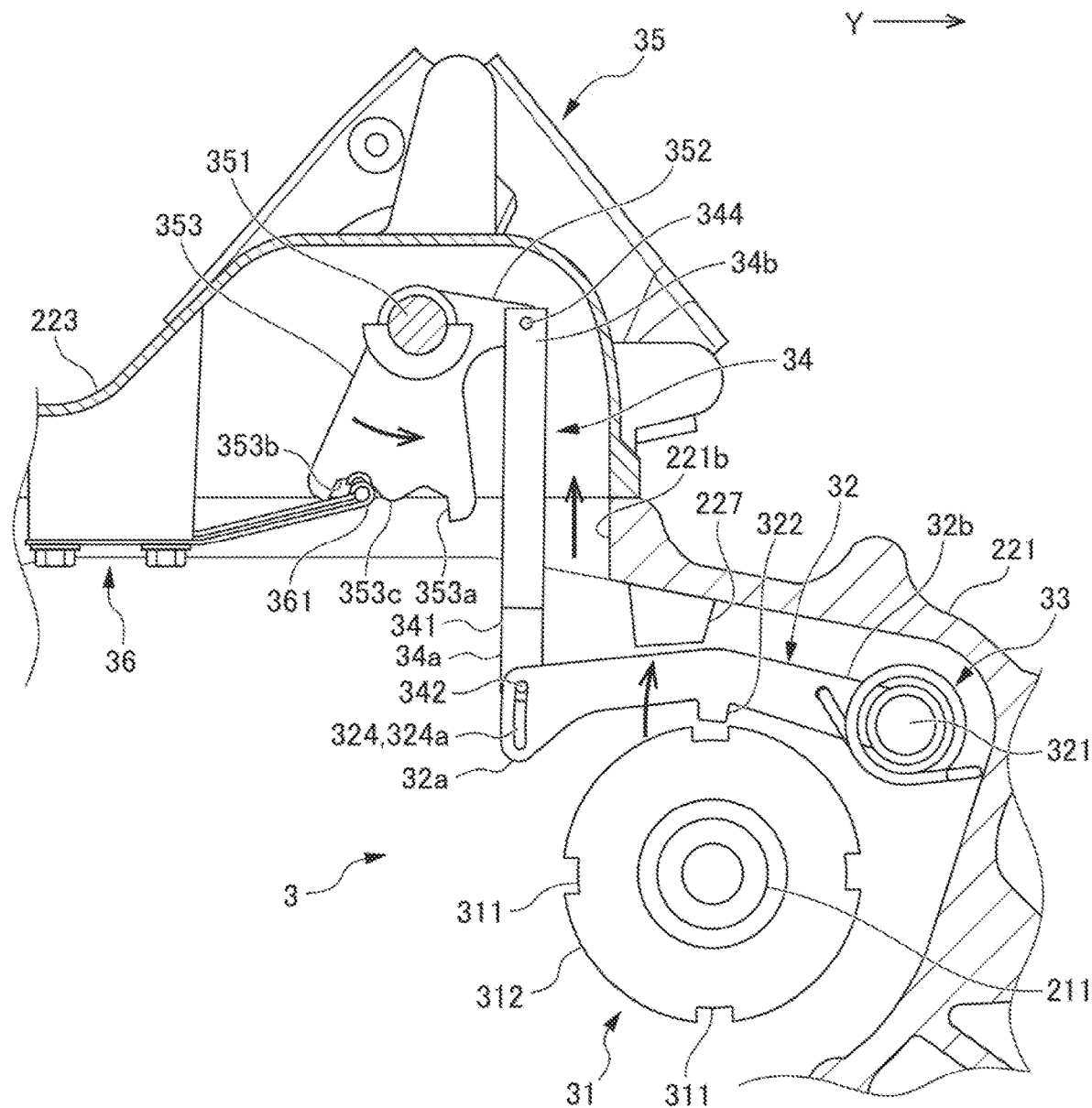
FIG. 7 is a view showing a fitting portion in a release state.

In the initial state, when a control signal for unlocking is output from the system controller 13 to the actuator controller 14, the actuator controller 14 outputs a driving signal to the actuator 35 to rotate the drive shaft 351 by a predetermined angle in the d11 direction in FIG. 6. At this time, as shown in FIG. 7, the locking plate 353 rotates forward from the initial state in a counterclockwise direction. Accordingly, the locking portion 361 fitted into the first recess 353a elastically gets over the projection 353c and is fitted into the second recess 353b, thereby positioning the drive shaft 351.

When the drive shaft 351 rotates by a predetermined angle from the initial state, the parking rod 34 is pulled up by the bracket 352 and moves upward. When the first engagement pin 342 abuts on the upper end of the oblong holes 324a of the parking pawl 32, the parking rod 34 pulls the rear end 32a of the parking pawl 32 upward. Thus, the parking pawl 32 rotates around the turning shaft 321 in the release direction away from the parking gear 31 against the urging force of the parking pawl spring 33. The parking pawl 32 is disposed at the release position, and the parking lock device 3 is in an unlocked state. During the unlocked state, the parking pawl spring 33 contracts due to the rotation of the parking pawl 32 in the release direction and accumulates energy for generating an urging force.

Figure 8:
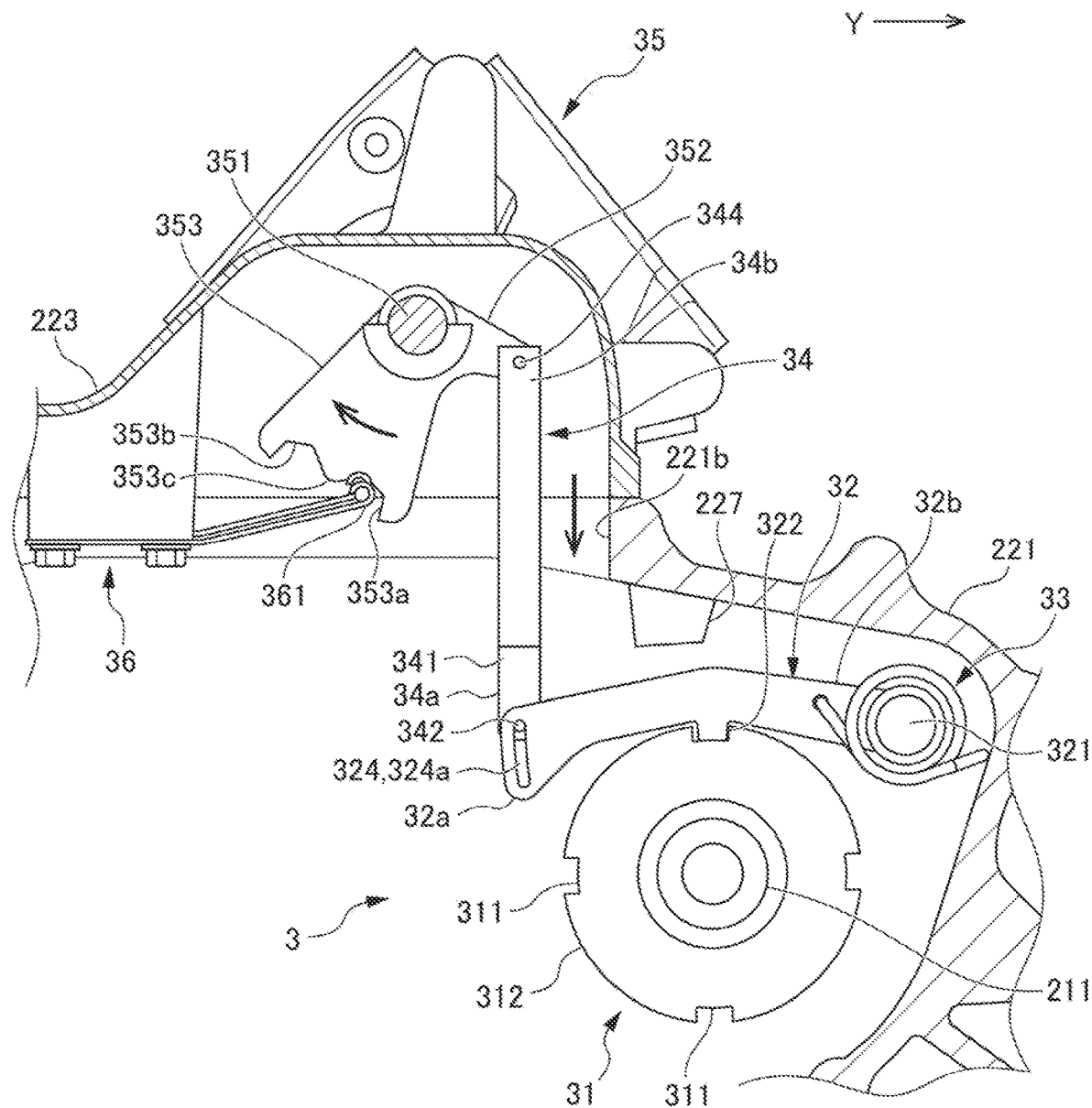
FIG. 8 is a view showing the fitting portion a fitted state.

In the unlocked state, when the control signal for parking lock is output from the system controller 13 to the actuator controller 14, the actuator controller 14 outputs a driving signal to the actuator 35 to rotate the drive shaft 351 by a predetermined angle in the d21 direction in FIG. 6. At this time, as shown in FIG. 8, the locking plate 353 rotates rearward in the clockwise direction and returns to the initial state. Accordingly, the locking portion 361 fitted into the second recess 353b gets over the projection 353c and is fitted into the first recess 353a, thereby positioning the drive shaft 351.

When the drive shaft 351 returns to the initial state, the parking rod 34 is pushed down against the bracket 352 and moves downward. When the parking rod 34 moves to reach a lower position, the parking pawl 32 can move in the fitting direction. For this reason, the parking pawl spring 33 releases the accumulated energy, and generates an urging force. Due to the urging force, the parking pawl 32 rotates around the turning shaft 321 in the fitting direction toward the parking gear 31.

Figure 9:
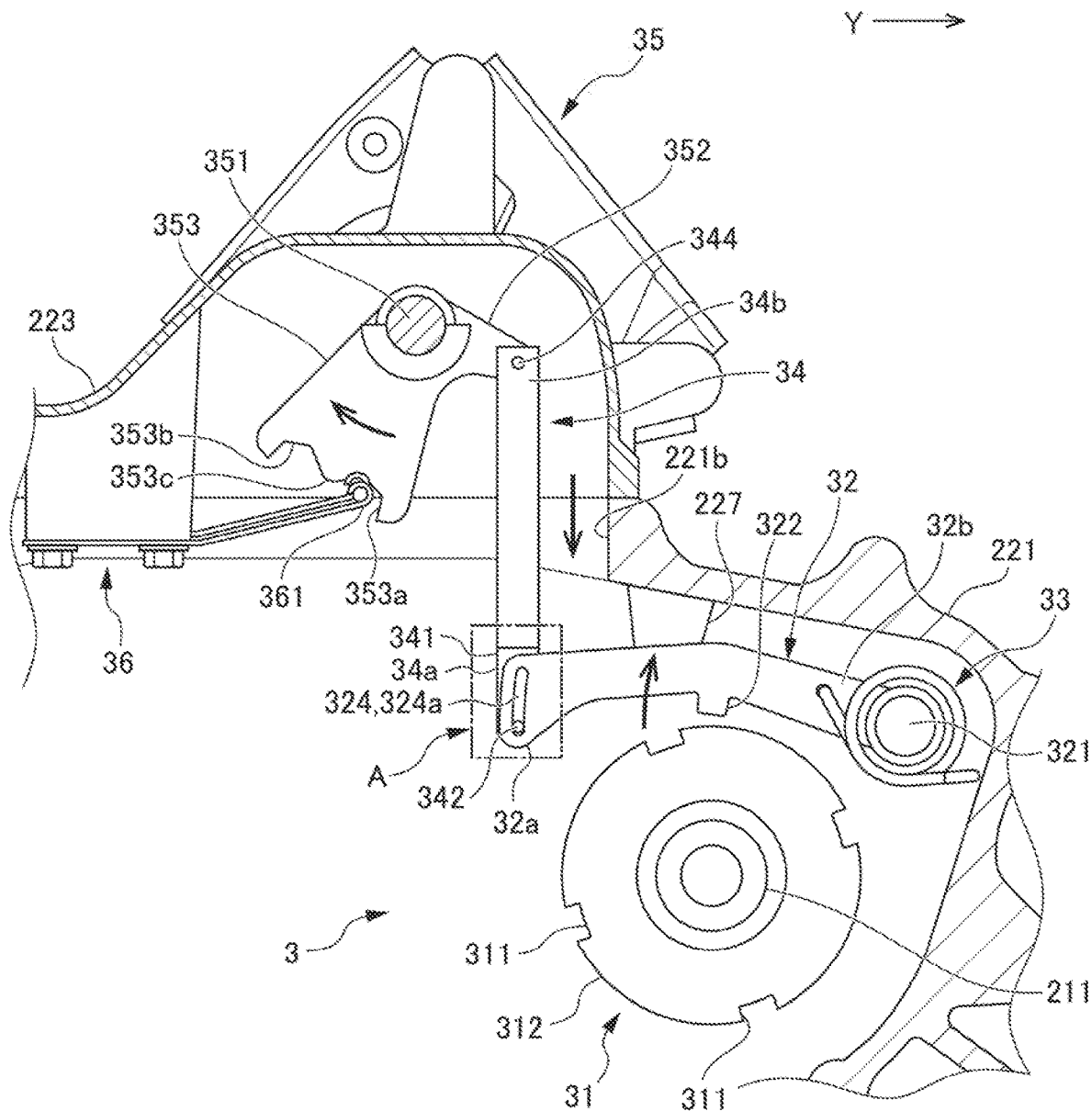
FIG. 9 is a view showing a state in which the fitting portion is flipped up.

In the case where the recess 311 of the parking gear 31 is disposed at the position where the protrusion 322 of the parking pawl 32 can be fitted as shown in FIG. 8 when the parking pawl 32 rotates in the fitting direction, the protrusion 322 is fitted into one of the recesses 311. Thus, the parking pawl 32 is disposed at the fitting position, and the parking lock device 3 is locked again. However, as shown in FIG. 9, when any of the recesses 311 of the parking gear 31 is not disposed at the position where the protrusion 322 of the parking pawl 32 can be fitted, the protrusion 322 of the parking pawl 32 collides with the projection 312 of the parking gear 31. At this time, the parking pawl 32 is flipped upward, and the fitting operation is not completed.

Figure 10:
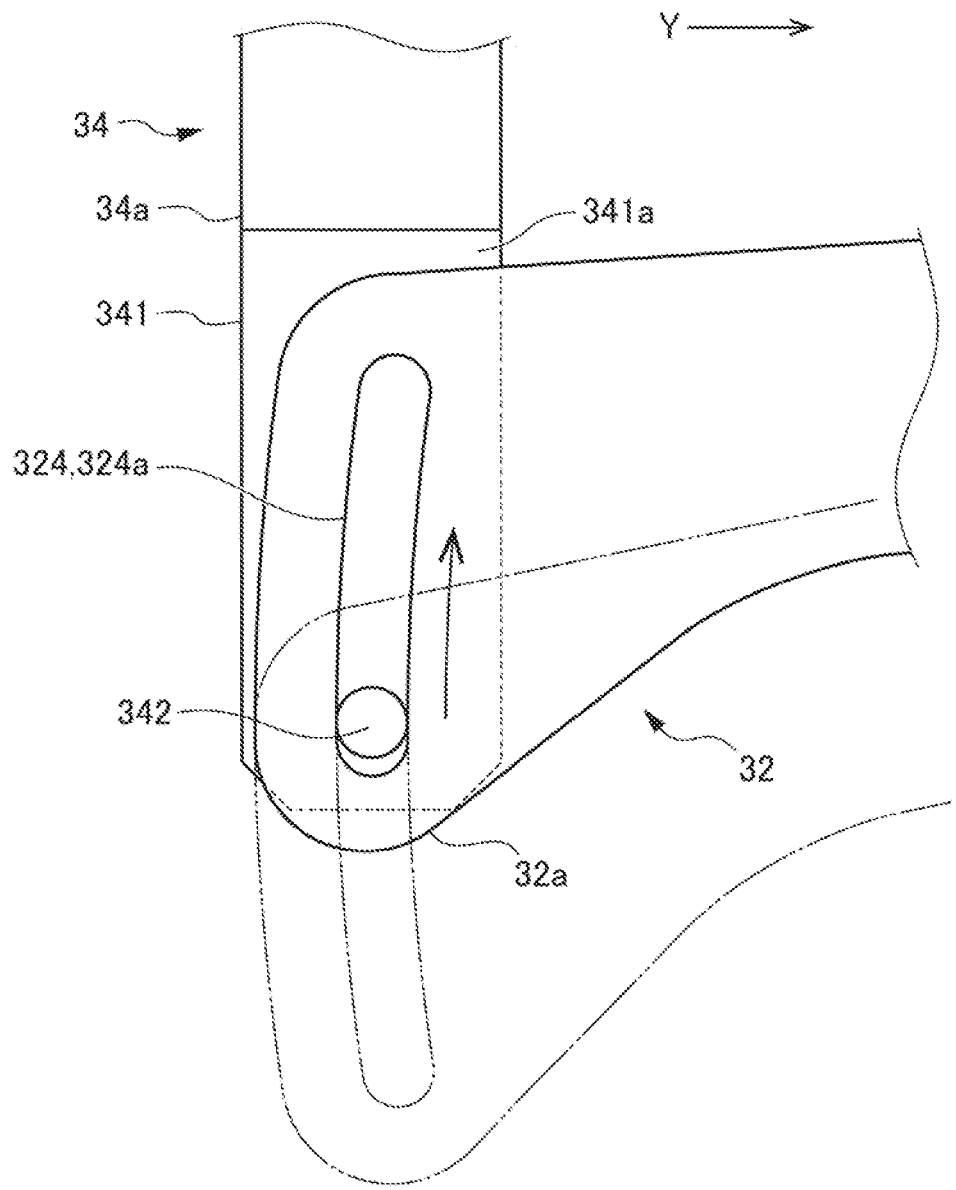
FIG. 10 is an enlarged view of part A in FIG. 9.

During a period in which the fitting operation is not completed, the parking rod 34 remains at the lower position. The rear end 32a of the parking pawl 32 engages with the first engagement pin 342 at the oblong hole 324a. When the parking pawl 32 is flipped upward, the parking pawl 32 moves upward within the range of the oblong holes 324a with respect to the first engagement pin 342, as shown in FIG. 10. This relieves the stress when the parking pawl 32 is flipped up. Therefore, the stress caused when the parking pawl 32 is flipped up during a period in which the fitting operation is not completed does not act on the parking rod 34, the drive shaft 351, and the actuator 35 from the parking pawl 32.

During a period in which the fitting operation is not completed, the parking pawl 32 is flipped up and rotates in the release direction, thereby the parking pawl spring 33 contracts again. The parking pawl spring 33 accumulates energy for generating an urging force again based on the stress due to the contraction. Thereafter, when the parking gear 31 rotates and the position of one of the recesses 311 coincides with the position of the protrusion 322, the parking pawl 32 rotates around the turning shaft 321 in the fitting direction due to the action of the urging force of the parking pawl spring 33 generated when the accumulated energy is released. Since the energy for re-fitting acts on the parking pawl 32, which is not fitted yet, due to the contracted parking pawl spring 33, even when the power of the actuator 35 is turned OFF, the parking pawl 32 can be refitted.

When the parking pawl 32 rotates in the fitting direction, the rear end 32a of the parking pawl 32 moves downward in a state where the first engagement pin 342 engages with the oblong holes 324a as indicated by a dashed line in FIG. 10. As a result, as shown in FIG. 8, the protrusion 322 is refitted into one of the recesses 311. Thus, the parking pawl 32 is disposed at the fitting position, and the parking lock device 3 is locked.

According to the parking lock device 3 of the present embodiment described above, the following effects are achieved. The parking lock device 3 includes the parking gear 31, the parking pawl 32 (fitting portion) that is fittable into the parking gear, the parking rod 34 (engaging portion) that engages with the parking pawl 32, and the actuator 35 (driving portion) that drives the parking rod 34 to move the parking pawl 32 in the release direction with respect to the parking gear 31, and the parking pawl 32 includes the parking pawl spring 33 (re-fitting part) that generates the re-fitting action based on the stress generated during a period in which the fitting operation for fitting the parking pawl 32 into the parking gear 31 is not completed. Accordingly, since the parking pawl 32 fittable into the parking gear 31 per se includes the parking pawl spring 33 serving as the re-fitting part, it is not necessary for the parking rod 34 to have the role of receiving the stress that occurs during a period in which the fitting operation is not completed and the role of performing the re-fitting operation based on the stress. Therefore, it is possible to prevent the stress for re-fitting from being transmitted to the actuator 35 through the parking rod 34. Therefore, the load acting on the actuator 35 is reduced, and there is no concern of the actuator 35 being damaged.

In the present embodiment, the parking pawl 32 includes the oblong hole 324a as a relief portion for the stress generated during a period in which the fitting operation for fitting the parking pawl 32 into the parking gear 31 is not completed. Accordingly, it is possible to effectively avoid the influence on the parking rod 34, the drive shaft 351, and the actuator 35 during the period in which the fitting operation is not completed.

In the present embodiment, the parking pawl 32 includes the engagement hole 324 (engaged portion) that is provided on the rear end 32a to engage with the parking rod 34 and the parking pawl spring 33 provided on the front end 32b, and the front end 32b of the parking pawl 32 is provided with the turning shaft 321 that accumulates the energy for causing the parking pawl spring 33 to generate the re-fitting action when the stress is generated during the period in which the fitting operation for fitting the parking pawl 32 is not completed. Accordingly, during the period in which the fitting operation is not completed, the parking pawl 32 rotates around the turning shaft 321 in the release direction while avoiding the influence on the parking rod 34, the drive shaft 351, and the actuator 35, and can accumulate energy for rotating the parking pawl 32 around the parking pawl spring 33 in the fitting direction.

In the present embodiment, the parking pawl spring 33 serving as the re-fitting means uses the accumulated energy to generate the energy required for the re-fitting action of the parking pawl. Accordingly, it is possible to efficiently generate energy for the re-fitting operation for the parking pawl 32. Further, since the energy for re-fitting acts on the parking pawl 32 during the period in which the fitting operation is not completed, power of the actuator 35 can be turned OFF, and power consumption can be reduced.

In the present embodiment, the parking rod 34 includes the first engagement pin 342 (engaging projection) inserted into the engagement hole 324, and the first engagement pin 342 abuts on the engagement hole 324 when the actuator 35 is driven, thereby realizing the release operation for releasing the parking pawl 32 from the parking gear 31. Accordingly, it is possible to simply configure a mechanism for realizing the release operation for leasing the parking pawl 32 from the parking gear 31.

The vehicle according to the present embodiment includes the right rear wheel 12a, the left rear wheel 12b, and the parking lock device 3 described above, the parking gear 31, the parking pawl 32, and the parking rod 34 are provided corresponding to each of the right rear wheel 12a and the left rear wheel 12b, the actuator 35 includes one drive shaft 351, and the parking rod corresponding to the right rear wheels 12 and the parking rod 34 corresponding to the left rear wheel 12b are connected to the one drive shaft 351, respectively. Accordingly, it is not necessary to provide the actuator 35 for each of the pair of parking gears 31. Therefore, the parking lock device 3 can be configured compactly. When being flipped up, the parking pawls 32 can be independently refitted into the parking gears 31, respectively.

Figure 11:
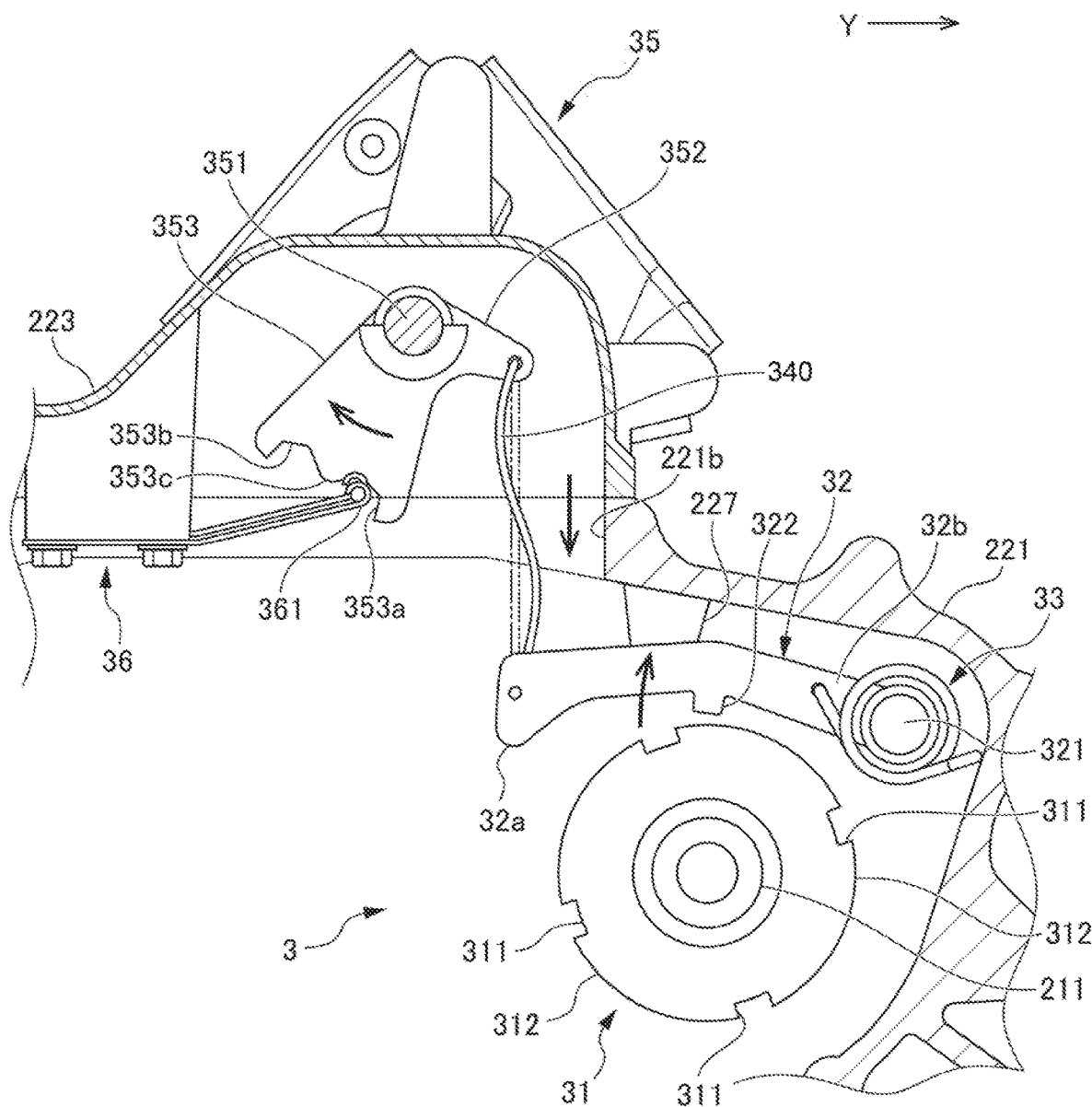
FIG. 11 is a view showing an engaging portion of another embodiment.

Although the parking rod 34 is used as the engaging portion in the embodiment described above, the engaging portion is not limited to such a configuration. Since the parking pawl 32 is urged in the fitting direction by the urging force of the parking pawl spring 33, the engaging portion may be configured to have a function of capable of rotating the parking pawl 32 in the release direction during rotation of the drive shaft 351. Therefore, as shown in FIG. 11, the engaging portion can also use a flexible cord-like member 340 such as a wire or a chain. Both ends of the cord-like member 340 are fixed to the rear end 32a of the parking pawl 32 and the bracket 352, respectively. As shown in FIG. 11, the cord-like member 340 bends during a period in which the fitting operation is not completed, and thus can function as a relief portion for releasing the stress due to the parking pawl 32 being flipped up. For this reason, the influence on the drive shaft 351 and the actuator 35 can be effectively avoided with a simple configuration.

Figure 12:
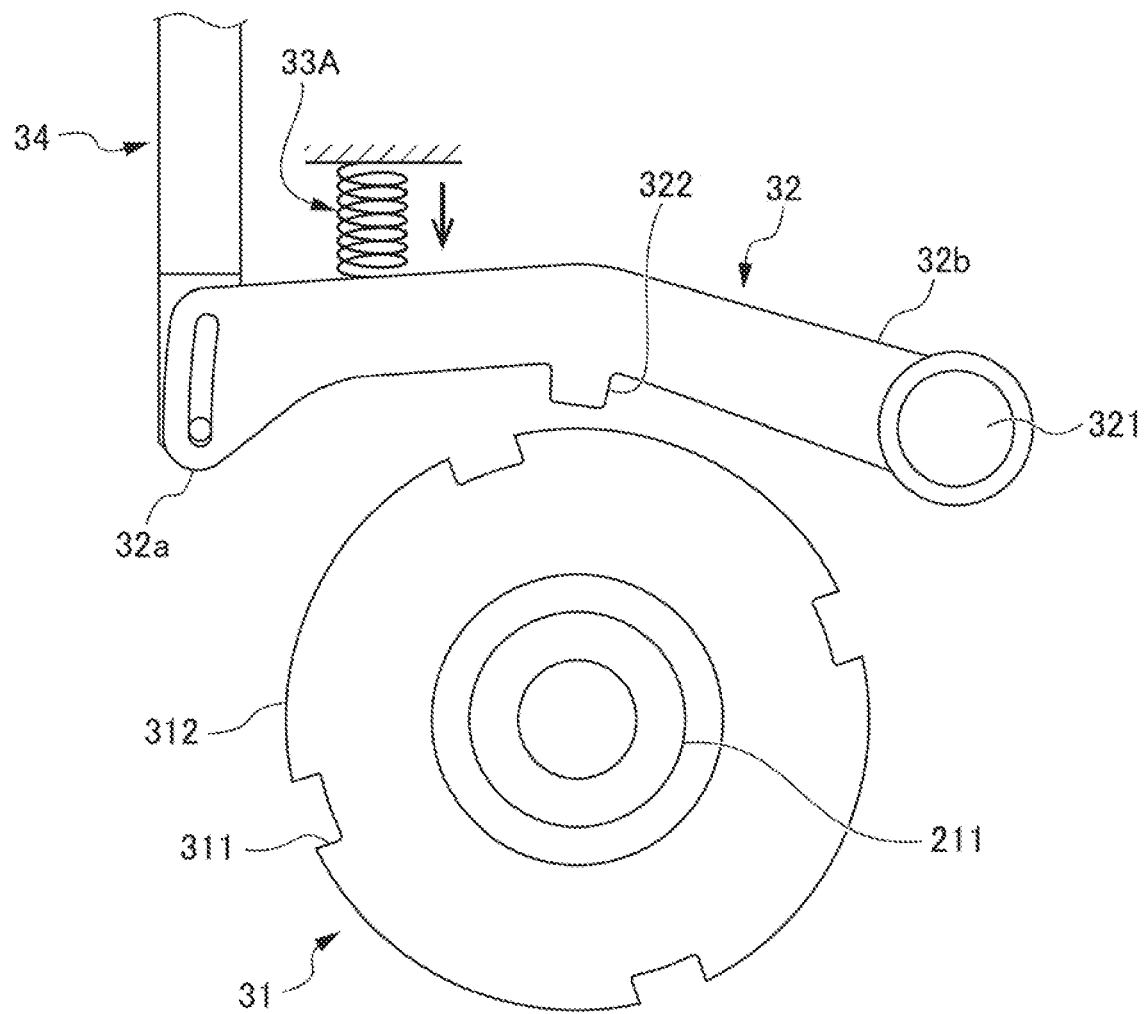
FIG. 12 is a view showing a re-fitting means of another embodiment.
Figure 13:
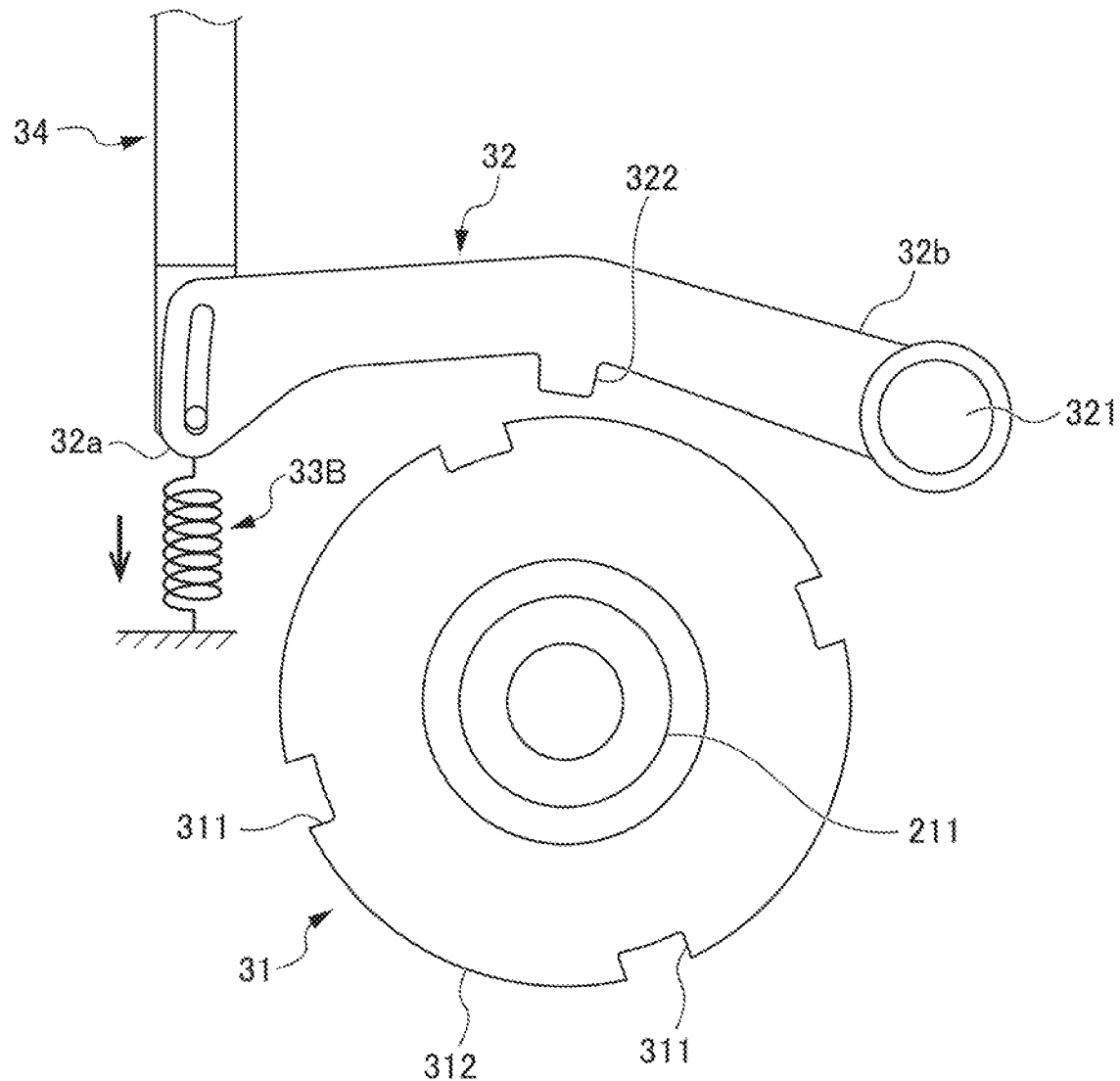
FIG. 13 is a view showing a re-fitting means of further another embodiment.

The parking pawl spring 33 is used as the re-fitting means in the present embodiment that is concentrically disposed on the outer circumference of the turning shaft 321 of the parking pawl 32, but the re-fitting means is not limited to such a configuration. The re-fitting means may be configured to generate the re-fitting action on the parking pawl 32 based on the stress generated during a period in which the fitting operation for the parking pawl 32 is not completed. Therefore, as shown in FIG. 12, the re-fitting means may be a pressing spring 33A that generates an urging force against the rear end 32a of the parking pawl 32 in a pressing direction toward the parking gear 31. Further, as shown in FIG. 13, the re-fitting means may be a tension spring 33B that generates an urging force against the rear end 32a of the parking pawl 32 in a pulling direction toward the parking gear 31. Further, although not shown, the re-fitting means may be an actuator such as a rotary solenoid or a motor that exerts an urging force in a direction to rotate the parking pawl 32 toward the parking gear 31.

The actuator 35 is used as the driving portion in the embodiment described above that rotates the drive shaft 351, but the driving portion is not limited to the configuration having a rotating drive shaft. The driving portion may be configured to linearly move the pair of engaging portions together. Therefore, the driving portion may be one such as a solenoid or a cylinder that linearly translates the pair of engaging portions based on the driving signal.

The parking pawl 32 serving as the fitting portion is disposed above the parking gear 31 in the embodiment described above, but the parking pawl 32 is not limited to being disposed above the parking gear 31. The parking pawl 32 may be disposed below the parking gear 31, or may be disposed on the front side or rear side of the parking gear 31. In such a case, the positions of the parking rod 34, the drive shaft 351, and the actuator 35 are changed depending on the position of the parking pawl 32.

EXPLANATION OF REFERENCE NUMERALS

1: vehicle
12a: right rear wheels
12b: left rear wheels
3: parking lock device
31: parking gear
32: parking pawl (fitting portion)
321: turning shaft
324: engagement hole (engaged portion)
324a: oblong hole (relief portion)
33: parking pawl spring (re-fitting part)
33A: pressing spring (re-fitting part)
33B: tension spring (re-fitting part)
34: parking rod (engaging portion)
342: first engagement pin (engaging projection)
35: actuator (driving portion)
351: drive shaft
34A: cord-like member (engaging portion)

What is claimed is:

1. A parking lock device comprising:
a parking gear;
a fitting portion that is fittable into the parking gear;
an engaging portion that engages with the fitting portion; and
a driving portion that drives the engaging portion to move the fitting portion in a release direction with respect to the parking gear,
the fitting portion including a re-fitting part that generates a re-fitting action based on stress generated during a period in which a fitting operation for fitting the fitting portion into the parking gear is not completed,
wherein the re-fitting part is a spring configured to urge the fitting portion toward the parking gear, and having one end fixed to the fitting portion and an other end fixed to a housing that houses the parking lock device,
wherein the fitting portion includes an engaged portion provided adjacent to one end and the re-fitting part provided adjacent to an other end, the engaged portion being engaged with the engaging portion, wherein the other end of the fitting portion has a turning shaft, wherein the spring accumulates energy for causing the re-fitting part to generate the re-fitting action when the stress is generated during the period in which the fitting operation is not completed, and exerts an urging force in the direction to rotate around the turning shaft, wherein the engaging portion includes an engaging projection to be inserted into the engaged portion, and wherein when the engaging portion is driven by the driving portion, the engaging projection abuts on the engaged portion, thereby performing a release operation for releasing the fitting portion from the parking gear.

2. The parking lock device according to claim 1, wherein either the fitting portion or the engaging portion includes a relief portion for the stress generated during the period in which the fitting operation for fitting the fitting portion into the parking gear is not completed.

3. The parking lock device according to claim 1, wherein the re-fitting part uses the accumulated energy to generate energy required for the re-fitting action of the fitting portion.

4. A vehicle comprising:
a right wheel;
a left wheel; and
the parking lock device according to claim 1,
the parking gear, the fitting portion, and the engaging portion being provided for each of the right wheel and the left wheel,
the driving portion including one drive shaft,
the engaging portion corresponding to the right wheel and the engaging portion corresponding to the left wheel each being connected to the one drive shaft.

5. The parking lock device according to claim 1, wherein the re-fitting part urges the fitting portion toward the parking gear in a direction in which the fitting portion rotates around the turning shaft, the re-fitting part being disposed coaxially with the turning shaft, on an outer circumference of the turning shaft.

6. The parking lock device according to claim 1, wherein the engaged portion is constituted by an oblong hole having an arc shape centered on the turning shaft.

7. A parking lock device comprising:
a parking gear;
a fitting portion that is fittable into the parking gear;
an engaging portion that engages with the fitting portion; and
a driving portion that drives the engaging portion to move the fitting portion in a release direction with respect to the parking gear, the fitting portion including a re-fitting part that generates a re-fitting action based on stress generated during a period in which a fitting operation for fitting the fitting portion into the parking gear is not completed, wherein the re-fitting part is a spring configured to urge the fitting portion toward the parking gear, and having one end fixed to the fitting portion and an other end fixed to a housing that houses the parking lock device, wherein the fitting portion includes an engaged portion provided adjacent to one end and the re-fitting part provided adjacent to an other end, the engaged portion being engaged with the engaging portion, wherein the other end of the fitting portion have a turning shaft, wherein the spring accumulates energy for causing the re-fitting part to generate the re-fitting action when the stress is generated during the period in which the fitting operation is not completed, and exerts an urging force in the direction to rotate around the turning shaft and wherein the engaged portion is constituted by an oblong hole having an arc shape centered on the turning shaft.

8. The parking lock device according to claim 7, wherein either the fitting portion or the engaging portion includes a relief portion for the stress generated during the period in which the fitting operation for fitting the fitting portion into the parking gear is not completed.

9. The parking lock device according to claim 6, wherein the re-fitting part uses the accumulated energy to generate energy required for the re-fitting action of the fitting portion.

10. A vehicle comprising:
a right wheel;
a left wheel; and
the parking lock device according to claim 7,
the parking gear, the fitting portion, and the engaging portion being provided for each of the right wheel and the left wheel,
the driving portion including one drive shaft,
the engaging portion corresponding to the right wheel and the engaging portion corresponding to the left wheel each being connected to the one drive shaft.

11. The parking lock device according to claim 7, wherein the re-fitting part urges the fitting portion toward the parking gear in a direction in which the fitting portion rotates around the turning shaft, the re-fitting part being disposed coaxially with the turning shaft, on an outer circumference of the turning shaft.

* * * * *